M. C. KILGORE.
HARVESTER.
No. 44,956.                    Patented Nov. 8, 1864.
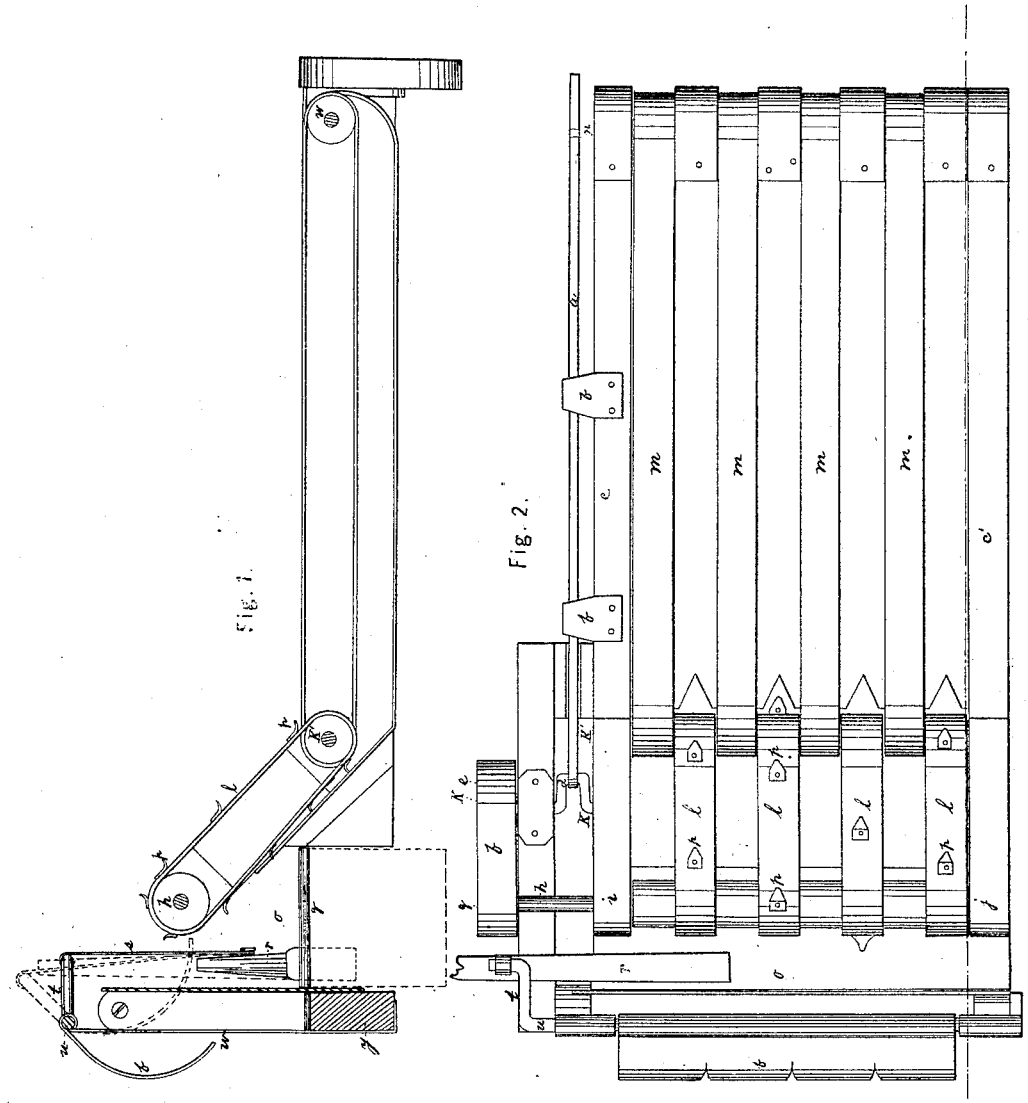

UNITED STATES PATENT OFFICE.

M. C. KILGORE, OF WASHINGTON, IOWA.

IMPROVEMENT IN HARVESTERS.

Specification forming part of Letters Patent No. 44,956, dated November 8, 1864.

*To all whom it may concern:*

Be it known that I, M. C. KILGORE, of Washington, in the county of Washington and State of Iowa, have invented a certain new and useful Improvement on Rakers for a Reaper; and I do hereby declare that the following is a clear, full, and exact description of the construction and operation of the same, reference being had to the accompanying drawings, and to the letters and marks thereon.

The drawings forming part of this specification show by Figure 1 a longitudinal sectional view of my raker, and by Fig. 2 a top view or a view had by looking down upon the raker.

My invention is intended to be used in connection with any reaper or reaping-machine to which it can be suitably attached, the power of the reaper being used to operate the raker, which power may be connected to shaft $k$, $a$ indicating the cutter-bar; $b$, the fingers; $c$, the front bar of the platform, and $d$ the crank of the shaft that gives rotation to a pulley or wheel, $e$, having upon it a band, $f$, that also passes around and gives motion to the wheel or pulley $g$ on the shaft $h$. The shaft $h$ has its bearings in arms $i$ and $j$, extending up from the side bars, $c$ $c'$, of the table or platform. Another shaft, $k'$, is also sustained at the bottom of the arms $i$, both these shafts having pulleys or their equivalents, around which pass the belts $l$. Another series of belts, $m$, are around shaft $k$, and a shaft, $n$, at the other end of the table or platform, also having bearing in the bars $c$ $c'$. Instead of these belts, canvas may be used; but whether canvas or the belts be used two aprons—the one horizontal and the other inclined upward—are formed, connected to each other and operated together for the conveyance of the cut grain, which, falling upon the horizontal apron, is conveyed toward the inclined apron, and then upward to be delivered into the box or chamber $o$. Upon the bands of the inclined apron are teeth $p$. Like teeth or other suitable teeth may be attached to the bands of the horizontal apron.

The box or chamber $o$ has a movable bottom, $q$, pivoted or hinged at one end and there attached to a lever, $r$, which may be moved and controlled by the attendant. From this lever an arm, $s$, passes up to a crank-arm, $t$, affixed to shaft $u$, on which are attached hooks or curved arms $v$, the relation of this connection between the hooks or arms $v$ and the movable bottom $q$ being such that when the bottom is dropped to allow the grain or sheaf to fall out the hooks or arms are moved forward to catch the grain from the upper apron, and when the bottom is moved up the hooks or arms are moved back, the contents of the arms dropping into the box. These two conditions of the bottom and arms are indicated by the black and red lines in Fig. 2 of the drawings. The shaft $u$ is supported upon and has suitable bearings in arms $w$, attached to the end bars, $y$, of the raker.

What I claim as my invention, and desire to secure by Letters Patent, is—

1. The box or chamber, with its lever and arm, and hooks or arms of the shaft $u$ for receiving and dropping the grain or sheaf, arranged and operating as set forth.

2. The horizontal and inclined aprons, in combination with the box or chamber having a movable bottom, and with the hooks or arms of the shaft $u$, arranged and operated substantially as described.

This specification signed this 15th day of August, 1864.

M. C. KILGORE.

Witnesses:
S. G. OWEN,
J. F. BROWN.